Feb. 7, 1939.  G. F. BOESSER  2,145,917
COMBINED CAMERA AND FLASH LAMP
Filed July 8, 1936  4 Sheets—Sheet 1
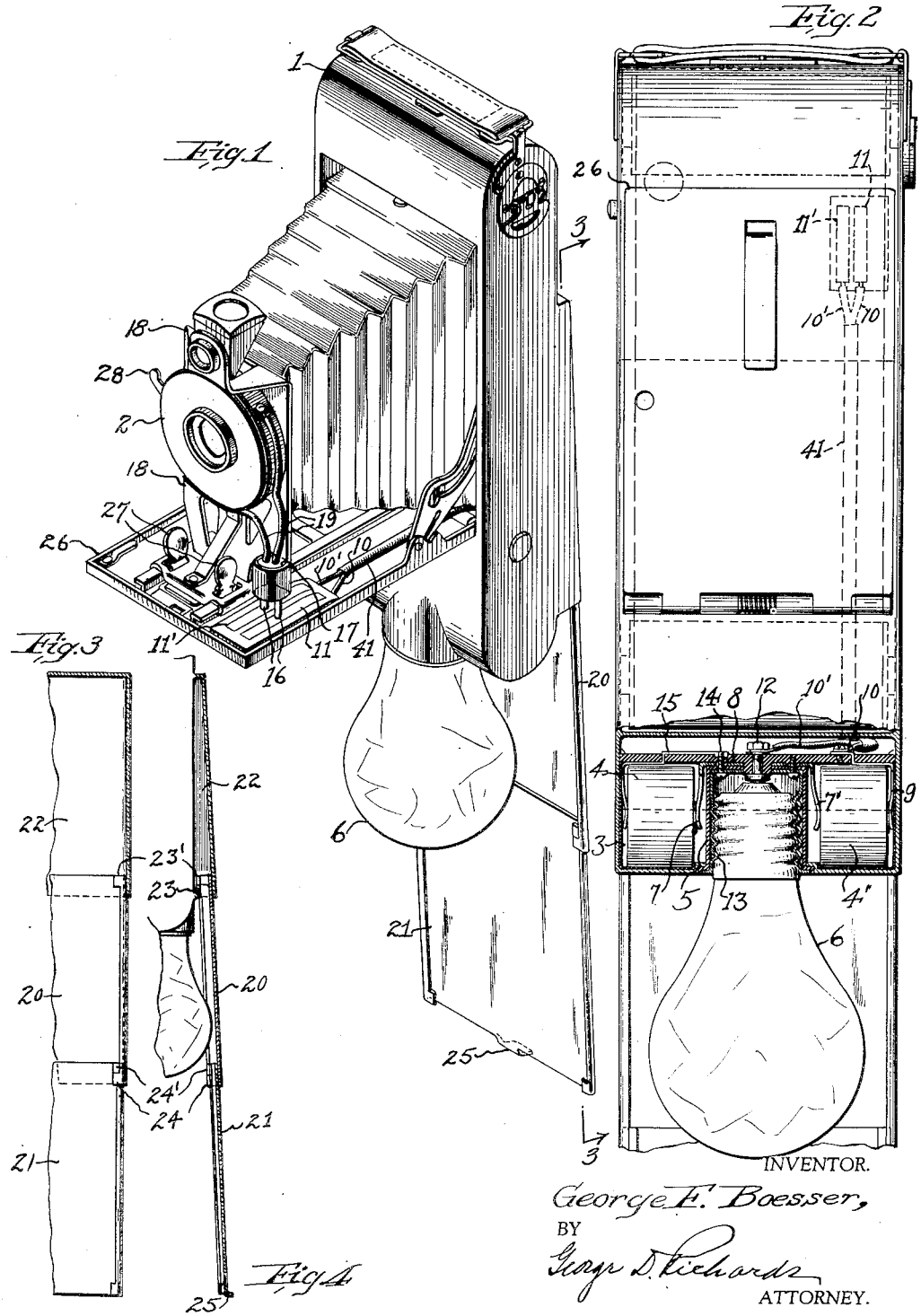
INVENTOR.
George F. Boesser,
BY
George D. Richards
ATTORNEY.

Feb. 7, 1939.  G. F. BOESSER  2,145,917
COMBINED CAMERA AND FLASH LAMP
Filed July 8, 1936  4 Sheets-Sheet 2
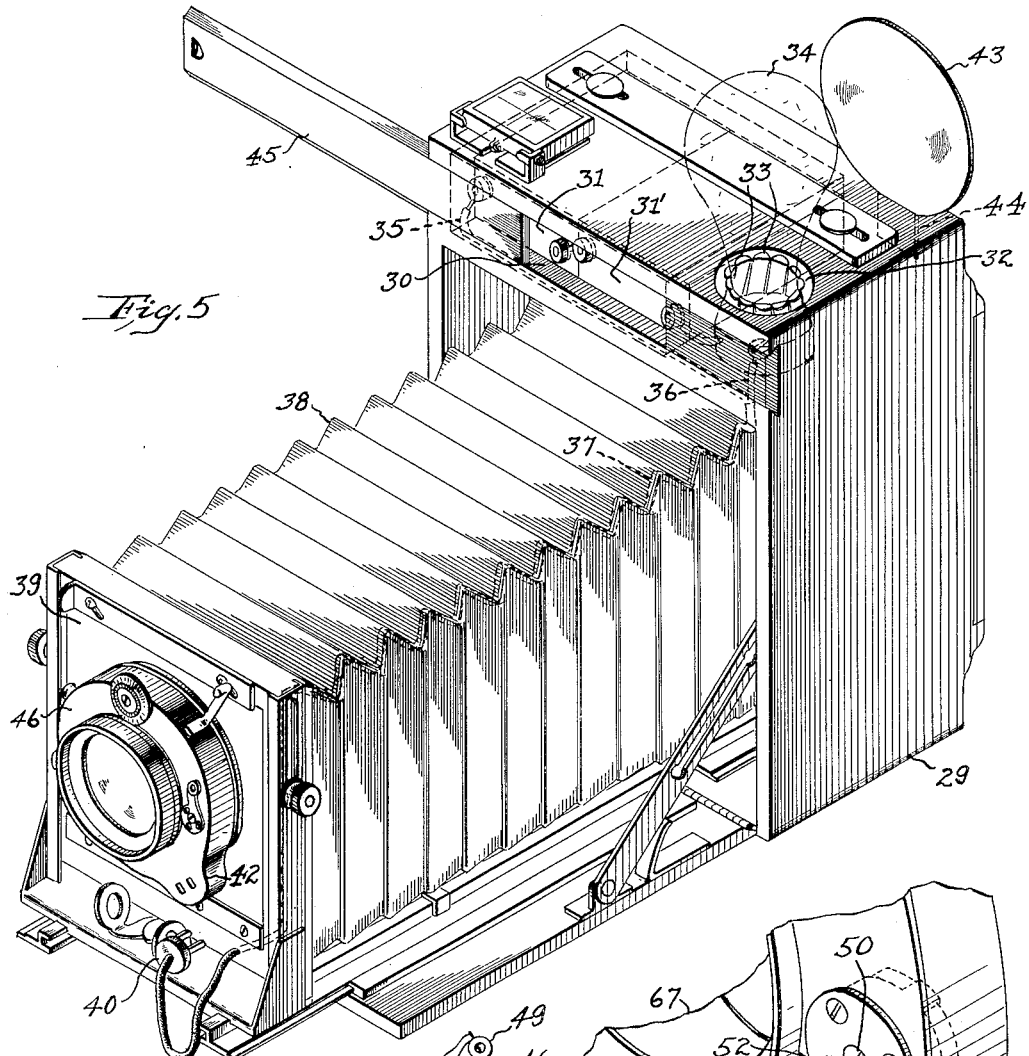
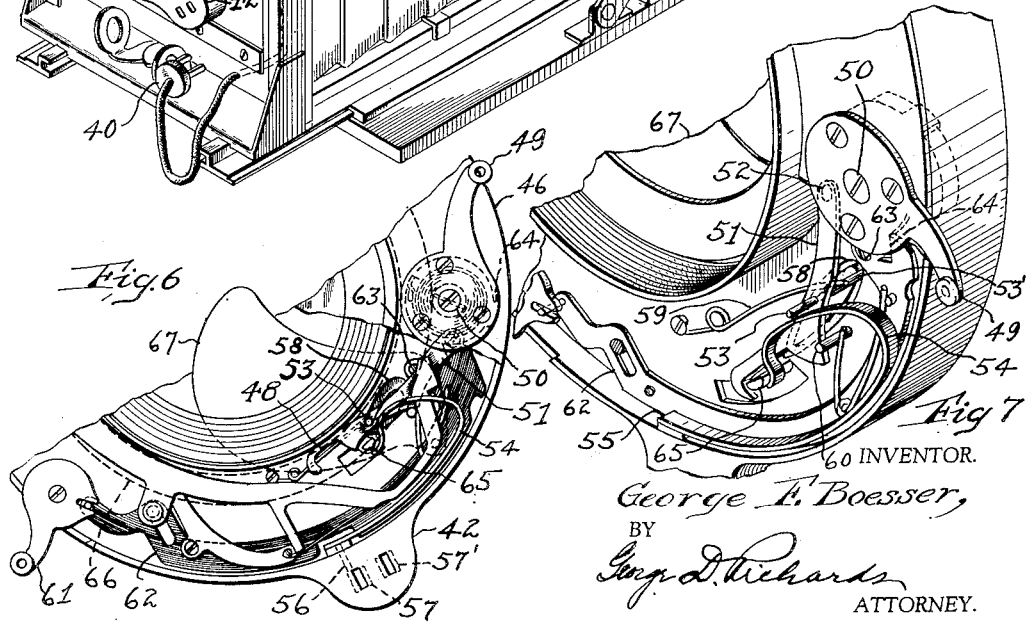

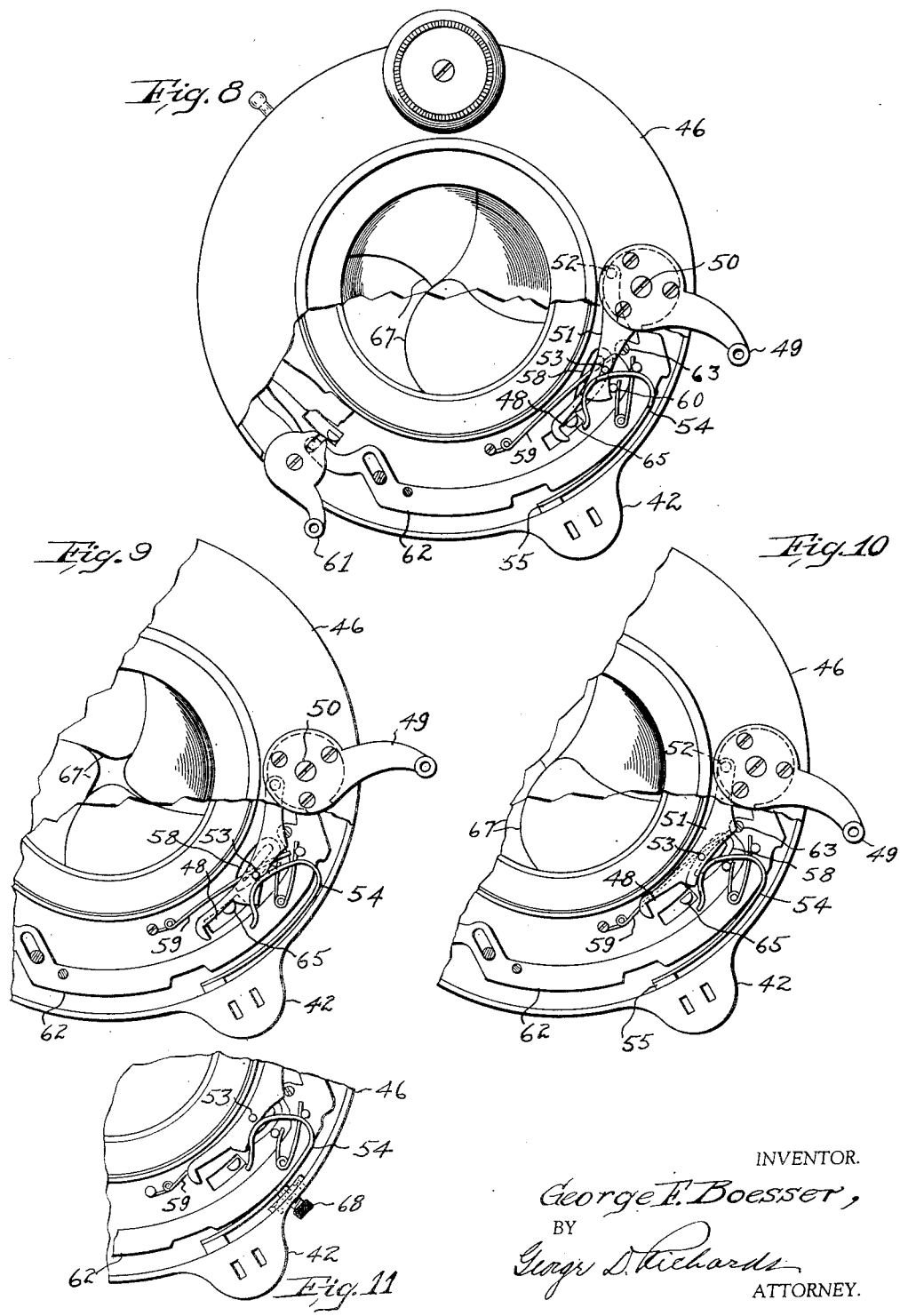

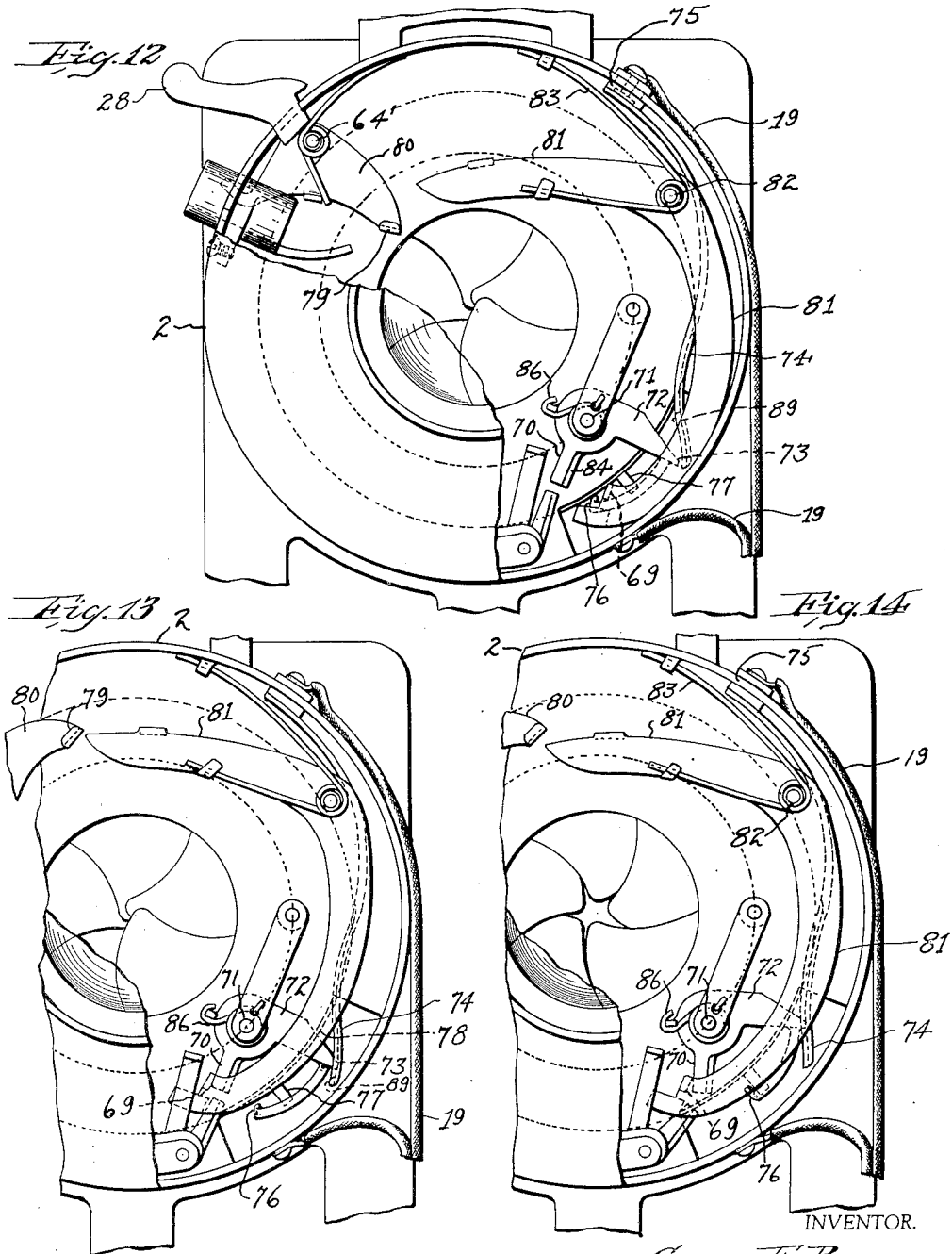

Patented Feb. 7, 1939

2,145,917

UNITED STATES PATENT OFFICE 2,145,917

COMBINED CAMERA AND FLASH LAMP

George F. Boesser, Arlington, N. J.

Application July 8, 1936, Serial No. 89,510

6 Claims. (Cl. 67—29)

This invention relates, generally, to the taking of pictures by flashlight; and the invention has reference, more particularly, to a novel construction of combined camera and flash lamp adapted for use in the taking of flashlight pictures.

In my Patent No. 1,932,098, issued October 24, 1933, there is disclosed a combined camera and flash lamp wherein the camera shutter is equipped with contact means for automatically synchronizing flash bulb and camera shutter operations. In said patent, a separate casing was employed for holding the flash light battery and for receiving the flash lamp, the said casing being adapted to be held in one hand while the other hand held the camera and released the shutter.

The principal object of the present invention is to provide a novel combined camera and flash lamp construction wherein the camera itself is so constructed and arranged that the same is adapted to hold the battery and flash lamp, thereby simplifying the apparatus and greatly facilitating the operation of the camera since both hands are free to operate the same.

Another object of the present invention is to provide a novel combined camera and flash lamp construction of the above character wherein the camera is provided with a compartment for receiving the flash lamp battery or batteries, and wherein socket means is provided for receiving the base of the flash lamp, the camera having leads incorporated therein for conveying current from the battery to the contact operating mechanism of the shutter and from thence to the flash lamp.

Still another object of the invention lies in the provision of a novel combined camera and flash lamp construction of the above character that is of neat and attractive appearance, that is easy to operate and which is provided with reflecting means for effectively directing the light of the flash lamp at the object to be photographed.

Other objects of this invention, not at this time more particularly enumerated, will be clearly understood from the following detailed description of the same.

The invention is clearly illustrated in the accompanying drawings, in which:

Fig. 1 is a perspective view of a combined camera and flash lamp construction involving the principles of the present invention, the said camera being shown open ready for use.

Fig. 2 is a view similar to Fig. 1 but with parts broken away, and shows a camera in closed condition.

Fig. 3 is a fragmentary sectional view taken along the line 3—3 of Fig. 1.

Fig. 4 is an end view of the structure of Fig. 3.

Fig. 5 is a perspective view of a different style of camera construction embodying the principles of the present invention, the camera being shown in opened condition ready for use.

Fig. 6 is an enlarged fragmentary view with parts broken away of the camera shutter shown in Fig. 5, and illustrates the shutter contact means employed for completing the circuit of the photo-flash bulb, the shutter mechanism being shown prior to the setting thereof.

Fig. 7 is a perspective view illustrating the structure of Fig. 6, but showing the shutter in set position preparatory to making an exposure.

Fig 8 is a view in front elevation of the shutter of Figs. 6 and 7, with parts broken away and illustrates the initial engagement of the cooperating contact means which engagement takes place after the camera release or operating lever has been actuated and before the shutter blades have started to open.

Fig. 9 is a view similar to Fig. 8 with parts broken away, and illustrates the position of the contact means as the shutter blades begin to open.

Fig. 10 is a view similar to Fig. 9, but illustrates the position of the contact means during the setting of the shutter.

Fig. 11 is a fragmentary view showing a slight modification.

Fig. 12 is an enlarged view in front elevation with parts broken away of the camera shutter of Fig. 1, and illustrates the shutter contact means employed for completing the circuit of the photo-flash bulb.

Fig. 13 illustrates a portion of the structure of Fig. 12 but shows the operating lever in depressed position just after releasing the shutter mechanism, and Fig. 14 is a view similar to Fig. 13 but shows the position of the parts just as the shutter blades begin to open.

Similar characters of reference are employed in said views to indicate corresponding parts.

Referring now to Figs 1 to 4 of the said drawings the reference numeral 1 designates a camera of the "Kodak" type having a shutter 2 that is equipped with contact means for automatically synchronizing the flash bulb and camera shutter operations as disclosed in my prior patent, previously referred to.

The casing of camera 1 is made somewhat longer than the ordinary camera of this type to provide a compartment 3 in the lower portion thereof for receiving a flash lamp battery or batteries as 4 and 4'. Disposed centrally within the compartment 3 is a flash lamp socket 5 having an opening at the lower end of the camera for receiving a flash lamp 6 when it is desired to take a flash-light picture. Unlike terminals of the two batteries 4 or 4' are connected together by spring contacts 7 and 7' and jumper 8. The remaining terminal of battery 4' is connected by spring contact 9 and lead 10 extending within cable 41 to a contact strip 11 mounted on the inner surface of the hinged cover 26 of the camera. Strip 11 is insulated from an adjacent and parallel strip 11' that is connected by a lead 10' extending within cable 41 and leading to the central contact post 12 of socket 5. The threaded receptacle portion 13 of socket 5 is connected by screw 14 and spring contact 15 to the remaining terminal of battery 4.

The contact strips 11 and 11' are adapted to be engaged by prongs 16 provided on a plug or block 17 carried by the adjustable camera standard 18. Plug 17 is provided with leads 19 connected respectively to the respective prongs 16 and plug 17. Leads 19 extend to the camera shutter 2 and are respectively electrically connected to the contact members therein that serve to complete the circuit for the flash lamp 6, as described in my prior patent.

In order to effectively direct the light of lamp 6 toward the object being photographed, the camera 1 is shown provided with an extensible reflector consisting of telescoping sections 20 and 21. These reflector sections are preferably made of metal coated with a suitable reflecting material such as chromium and are adapted to be telescoped into a compartment 22 provided in the back of the camera 1. The compartment 22 and the reflector section 20 are respectively provided with stops 23 and 24 that cooperate with stops 23' and 24' provided on telescoping sections 20 and 21, respectively, said cooperating stops serving to limit the outward movement of the reflector sections.

In use, when it is desired to take a flash-light photograph, a bulb 6 is threaded into receptacle 13 and the reflector sections 20 and 21 are pulled out of compartment 22 as by means of finger piece 25 provided on section 21. The camera is now ready for use, and when the hinged cover 26 is opened, as shown in Fig. 1, and the camera standard 18 pulled forwardly by means of finger piece 27 the contact prongs 16 are moved into engagement with the contact strips 11 and 11'. Owing to the length of the strips 11 and 11' the contact prongs 16 remain in engagement with these strips regardless of the focusing adjustment of the camera lens, thereby preparing a circuit extending from the shutter 2 through flash lamp 6 to batteries 4 and 4'. When it is desired to take the picture it is merely necessary to depress the shutter operating lever 28, thereby completing the circuit within the camera shutter 2, in the manner disclosed in my prior patent, and igniting the bulb 6 synchronously with the operation of the shutter. After using the camera the cover 26 of the same may be closed, the bulb 6 removed and discarded and the reflector sections 20 and 21 telescoped into the compartment 22, whereupon the camera has the same compact appearance as the ordinary camera of this type.

In Fig. 5 the invention is shown applied to a typical commercial camera such as used by professional camera men. In this figure, the camera 29 is shown provided in its upper portion with a compartment 30 for receiving a flash lamp battery or batteries 31 and 31'. A flash lamp socket or receptacle 32 is shown recessed in the top of camera 29, the socket 32 being shown as provided merely with contact springs 33 for frictionally holding the bulb in place, thereby allowing the bulb 34 to be quickly pushed directly into the socket 32 and pulled therefrom rather than threaded therein and therefrom as required by a threaded socket, such as 13 shown in Figs. 1 to 4.

The batteries 31 and 31', and the contacts of the lamp socket are connected in series, by suitable leads as shown. Two leads 35 and 36 contained within cable 37 extend forwardly from the battery and socket respectively. Cable 37 is contained within the camera bellows 38 and is shown following the contour of this bellows 38, the forward end of the cable extending through the adjustable camera standard 39 and having a plug 40 thereon. Plug 40 is adapted to be inserted into an electrical socket 42, in the manner disclosed in my prior patent.

The camera 29 is shown provided with a detachable reflector 43 positioned behind bulb 44 for directing the light rays forwardly upon the object being photographed. Reflector 43 is shown provided with a tongue 44 adapted to extend into a suitable socket or recess provided in the top of the camera casing. The compartment 30 is shown provided with a removable slide 45 for enabling ready access to the same, as when replacing batteries.

In operation, it is merely necessary to insert the bulb 34 into socket 32, place reflector 43 in place behind bolt 34 and insert plug 40 into socket 42, whereupon the actuation of the operating lever of shutter 46 serves to automatically ignite bulb 34 synchronously with the operation of the camera shutter. It will be understood that the leads 10 and 10' of the form of the invention shown in Figs. 1 to 4 may also be enclosed within the camera bellows, if desired, thereby eliminating the use of contact strips 11 and 11'. Also, it will be apparent that the plug 40 and socket 32, of Fig. 5, may be omitted, if desired, and the leads 35 and 36 of cable 37 connected directly to the proper contacts within the shutter casing, as will be apparent.

In Figs. 6 to 10 the contact means and associated parts of the camera shutter of the form of the invention shown in Fig. 5 is illustrated in detail, this structure being somewhat different from the arrangement shown in my previous patent. In these figures the shutter 46 is shown as having a setting or rewinding lever 49 pivoted at 50, and which has a shutter operating link 51 pivoted thereto at 52. Shutter operating link 51 is provided with a slot or recess 48 for cooperating with a stud 65 fixed on a shutter blade actuating ring member 66. Slot 48 is considerably larger than the width of stud 65 whereby stud 65 is not actuated until after link 51 has moved through an appreciable distance as will further appear. Link 51 carries a movable contact pin 53 that is adapted to engage the looped end of a stationary spring contact member 54, which contact member is attached to, though insulated from the camera shutter casing at 55. Stationary contact member 54 (see Fig. 6) is connected as by a jumper 56 to one of the socket contacts 57 of socket 42, the other socket contact 57' being grounded upon the casing of the shutter and hence in electrical contact with the movable contact member 53.

The movable contact pin or member 53 is shown projecting through the link 51 to provide a portion 53' for cooperating with a cam groove 58 having a substantially elliptical contour. The purpose of the cam groove 58 is to control the movement of contact pin 53 and prevent this contact pin from engaging stationary contact member 54 while setting the shutter by operating lever 49, for if engagement of the contacts 53 and 54 were to take place during the setting movement of lever 49 the bulb 34 would be blown prematurely, if this bulb were in the socket 32 at such time as might be the case.

In operating setting lever 49, the same is pressed downwardly from the position shown in Fig. 6 to that shown in Fig. 7. It will be noted by referring to Figs. 6, 7 and 10 that at the beginning of the setting movement, i. e. as one starts to press lever 49 downwardly link 51 rides over stud 65 without actuating the same and the portion 53' of the movable contact pin engages the inner portion or run of cam groove 58, and as the lever 49 is further depressed the portion 53' rides up along this inner run of cam groove 58 (see Fig. 6). Fig. 10 shows the position of the parts when the setting lever has moved approximately through half of its setting movement toward set position and it will be noted that pin 53 has moved along substantially one-half the length of the inner run of cam groove 58, this cam groove serving to hold the pin 53 outwardly and out of engagement with the stationary contact spring or member 54 during the setting movement.

A light leaf spring 59, bears continuously upon the portion 53' of the contact pin and urges this pin outwardly toward the stationary contact 54, so that as soon as portion 53' of the contact pin reaches the upper end of cam groove 58, corresponding to set or rewound position of the lever 49, spring 59 serves to press portion 53' outwardly into the outer run of groove 58 so that slot 48 of the shutter operating link 51 moves out so as to receive stud 65 therein and link 51 abuts a fixed stop pin 60. In this position of the lever 49 the contact pin 53 is spaced slightly from the spring contact 54 as shown in Fig. 7. The shutter is now ready to be operated, which operation is accomplished by pressing upon the operating or release lever 61. By pressing upon lever 61 the same is caused to actuate a link 62 that is pivoted at 63 adjacent the setting lever 49, link 62 serving to release the setting lever by disengaging a stop at 64, thereby permitting the shutter mechanism to function for opening the shutter. As the setting lever 49 starts to move upwardly the portion 53' of the contact 53 rides down the outer run of cam groove 58 so that movable contact 53 quickly engages the stationary contact member 54 before the shutter blades have been actuated, thereby completing the circuit for the photo-flash bulb 34.

Owing to the relatively long length of recess 48, the link 51 continues to move an appreciable distance after contacts 53 and 54 have been engaged before the end of recess 48 engages stud 65 to effect the opening of the shutter blades 67. As disclosed in my prior patent, ring 66 carrying stud 65 actuates leaves or blades 67 through the use of drive pins as is well known to those skilled in the art. Thus, the closing of the circuit for the photo-flash bulb 34 before the shutter blades have started to open enables the bulb to reach a desired degree of brightness for suitably exposing the film at the time the blades actually open.

In Fig. 11, an adjustable screw 68 is provided for adjusting the position of stationary contact 54 to thereby vary at will the time of ignition of the photo-flash bulb with respect to the time of opening of the shutter blades, thereby accommodating the camera to the use of different types of photo-flash bulbs. Screw 68 is threaded through the shutter casing and connected to contact 54 for moving the latter.

In Figs. 12 to 14 the contact means and associated parts of the camera shutter of the form of the invention shown in Fig. 1 is illustrated in detail, this structure being somewhat different from the arrangement shown in my previous patent. In these figures, the operating lever 28 is pivoted at 64' and has an arm 80 for coacting with a C-shaped actuating lever 81 pivoted at 82. A spring 83 urges lever 81 counterclockwise about its pivotal pin 82, so that the lower portion of lever 81 normally abuts the casing of shutter 2. The lower end portion of lever 81 has a lug 69 for engaging an arm 70 of a bell crank shutter actuating lever pivoted at 71 and having a movable contact carrying arm 72, the free or contact end 73 of which is adapted to engage a stationary leaf spring type contact member 74 that is fixed upon, though insulated from the shutter casing at 75, which stationary contact member is electrically connected to one of the leads 19, the other lead 19 being grounded on the shutter casing and hence in electrical contact with the movable contact 73.

A coil torsion spring 86 urges bell crank lever 70, 72 clockwise and normally holds contact 73 out of engagement with contact 74. Arm 72 of the bell crank lever has an extension provided with a lug 76 that is normally spaced from a projection 77 provided on shutter operating ring member 78, whereby a lost motion connection is provided between the ball crank lever and the ring member.

In operation, when it is desired to make an exposure, the operating lever 28 is depressed, thereby turning arm 80 upwardly and causing cam lug 79 on this arm to engage and turn actuating lever 81 clockwise. Continued motion of lever 81 causes lug 69 to ride up the inclined surface 84 and over arm 70 of the bell crank lever. Shortly thereafter, arm 80 rides upwardly past the end of actuating lever 81, whereupon spring 83 acts to quickly turn lever 81 counter clockwise causing lug 69 acting upon arm 70 to turn the bell crank lever counter clockwise and effect the engagement of movable contact 73 with stationary contact 74, thereby completing a circuit for photo-flash bulb 6 of Fig. 1.

Contact 73 has a wiping action upon stationary contact 74 and after contact 73 has wiped along contact 74 a predetermined distance, the lug 76 engages projection 77 thereby turning ring member 78 to effect the opening of the shutter blades as shown in Fig. 14. By the time the shutter blades are fully open the photo-flash bulb has reached its maximum luminosity, thereby insuring a perfect exposure. Just as the blades are fully open, the lug 69 rides off of arm 70, thereby permitting the bell crank lever to return to its initial position shown in Fig. 12 and allowing the shutter blades to close.

It will be noted that the timing of the actual opening of the shutter blades after the circuit for the photo-flash bulb has been completed is dependent entirely upon the shutter spring mechanism and is independent of the touch of the operator whether fast or slow so that the personal element is eliminated, whereby perfect exposures are uniformly obtained, and the same is true of the form of shutter shown in Figs. 6 to 11.

Preferably, the portion of stationary contact 74 that is engaged by movable contact 73 is longitudinally grooved as indicated at 88 so that the movable contact 73 is positively held against slipping transversely off of the stationary contact 74 during the wiping engagement of these contacts.

As many changes could be made in the above construction and many apparently widely different embodiments of this invention could be made without departing from the scope thereof, as defined by the following claims, it is intended that all matter contained in the above description or shown in the accompanying drawings shall be interpreted as illustrative and not in a limiting sense.

I claim:

1. In a combined camera and flash lamp construction of the character described, a camera of the type having a movable camera lens to provide focusing adjustment, said camera comprising a shutter having a housing and shutter operating mechanism therein, a camera casing having a compartment therein for receiving a battery, a socket provided in said casing for receiving the base of a photo-flash lamp and leads interconnecting said battery, said socket and the operating mechanism within said camera shutter housing for effecting synchronous operation of the camera shutter mechanism and the photo-flash lamp, said leads including a pair of spaced contact strips on the camera casing and movable prongs connected with the shutter mechanism and slidably engaging said contact strips for completing the lamp ignition circuit regardless of focusing adjustment of the camera lens.

2. In a combined camera and flash lamp construction, a camera having a casing provided with a hinged cover and a bellows provided with a shutter comprising a housing having operating mechanism therein, said shutter being movable outwardly of said casing, said casing having a battery receiving compartment and a socket for receiving a photo-flash lamp, and leads for interconnecting a battery within said compartment, said socket and said shutter mechanism within said shutter housing, said leads extending within the hollow interior of said bellows and conforming to the sinuous shape thereof.

3. In a camera, shutter-mechanism for suitably exposing a film and including a shutter casing having a shutter blade actuating ring, and a member for directly operating said ring within said casing, a photo-flash bulb, a battery, contact means within said shutter casing and associated with said ring operating member, circuit means interconnecting said photo-flash bulb, said battery and said contact means whereby, upon release of said shutter mechanism, a circuit is completed for said photo-flash bulb and thereafter said member contacts and actuates said blade actuating ring for synchronizing the operation of said bulb and said shutter mechanism and cam means cooperating with said member and operating to prevent pre-ignition of said photo flash bulb.

4. In a camera, a shutter having a casing and shutter-mechanism therein for suitably exposing a film, a photo-flash bulb, a battery, contact means associated with said shutter mechanism within said shutter case, circuit means interconnecting said photo-flash bulb, said battery and said contact means whereby, upon release of said shutter mechanism, a circuit is completed for said photo-flash bulb for synchronizing the operation of said bulb and said shutter mechanism, said circuit being completed before the actual exposure of the film, and cam means associated with said shutter mechanism for preventing the completion of said photo-flash bulb circuit during the setting of the shutter mechanism.

5. A camera having a casing, a socket provided on said casing for receiving a photo-flash bulb, a source of current for said bulb, shutter means including a shutter, a housing therefor and operating mechanism in said housing for suitably exposing a sensitized surface, contact mechanism within said shutter housing operated by said operating mechanism and connected in circuit with said bulb and said source of current, said shutter operating mechanism serving to suitably operate said contact mechanism to effect the ignition of said bulb and to immediately thereafter open said shutter and expose the sensitized surface, said camera casing being provided with a hinged cover having tracks thereon and said camera shutter housing having prongs for engaging said tracks, said tracks and said prongs being included in said circuit with said flash bulb and said source of current.

6. In a camera, a shutter case having shutter mechanism therein including shutter blades for suitably exposing a film, a photo-flash lamp, a battery, a movable contact carried by said shutter mechanism within said case, a stationary contact on said case inner wall, circuit means interconnecting said photo-flash lamp, said battery and said contact whereby, upon release of said shutter mechanism, a circuit is completed for said photo-flash lamp by engagement of said contacts, continued movement of said shutter mechanism causing said shutter blades to thereafter open, exposing the film synchronously with the full illuminations of said lamp, said movable contact having a depending portion, and a cam in said shutter case engaging said depending portion to prevent completion of the photo-flash lamp circuit during the shutter setting operation.

GEORGE F. BOESSER.